US012432483B2

(12) United States Patent
Murthy et al.

(10) Patent No.: US 12,432,483 B2
(45) Date of Patent: *Sep. 30, 2025

(54) METHOD AND SYSTEM FOR HYBRID NOISE CANCELLATION

(71) Applicant: Texas Instruments Incorporated, Dallas, TX (US)

(72) Inventors: Nitish K. Murthy, Allen, TX (US); Edwin Randolph Cole, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/183,416

(22) Filed: Feb. 24, 2021

(65) Prior Publication Data

US 2021/0185428 A1 Jun. 17, 2021

Related U.S. Application Data

(63) Continuation of application No. 13/646,921, filed on Oct. 8, 2012, now Pat. No. 10,966,014.

(Continued)

(51) Int. Cl.

*H04R 1/10* (2006.01)

*G10K 11/178* (2006.01)

(Continued)

(52) U.S. Cl.

CPC ..... *H04R 1/1083* (2013.01); *G10K 11/17857* (2018.01); *G10K 11/17881* (2018.01);

(Continued)

(58) Field of Classification Search

CPC ....... G10K 11/17885; G10K 11/17857; G10K 11/17881; G10K 2210/3027;

(Continued)

(56) References Cited

U.S. PATENT DOCUMENTS

| | | | |
|---|---|---|---|
| 5,600,729 | A | 2/1997 | Darlington |
| 5,841,876 | A | 11/1998 | Gifford et al. |

(Continued)

FOREIGN PATENT DOCUMENTS

| | | | |
|---|---|---|---|
| GB | 2142091 | A | 1/1985 |
| WO | WO 2010018879 | A1 | 2/2010 |

OTHER PUBLICATIONS

Streeter et al, Hybrid feedforward feedback active noise control, IEEE (Year: 2004).

*Primary Examiner* — Carolyn R Edwards

*Assistant Examiner* — Kuassi A Ganmavo

(74) *Attorney, Agent, or Firm* — Carl G. Peterson; Frank D. Cimino

(57) ABSTRACT

From a first microphone, first microphone signals are received that represent first sound waves. From a second microphone, second microphone signals are received that represent second sound waves. In response to the first microphone signals, analog processing is performed to estimate noise in the first sound waves, and first analog signals are generated for cancelling at least some of the estimated noise in the first sound waves. In response to the second microphone signals, digital processing is performed to estimate noise in the second sound waves, and digital information is generated for cancelling at least some of the estimated noise in the second sound waves. The digital information is converted into second analog signals that represent the digital information. The first and second analog signals are combined into third analog signals for cancelling at least some of the estimated noise in the first and second sound waves.

16 Claims, 2 Drawing Sheets

Related U.S. Application Data

(60) Provisional application No. 61/544,864, filed on Oct. 7, 2011.

(51) Int. Cl.
*H04R 3/02* (2006.01)
*H04R 5/033* (2006.01)

(52) U.S. Cl.
CPC .................. *G10K 11/17885* (2018.01); *G10K 2210/1081* (2013.01); *G10K 2210/3013* (2013.01); *G10K 2210/3026* (2013.01); *G10K 2210/3027* (2013.01); *H04R 3/02* (2013.01); *H04R 5/033* (2013.01); *H04R 2410/05* (2013.01)

(58) Field of Classification Search
CPC ... G10K 2210/3026; G10K 2210/1081; H04R 1/1083; H04R 3/02; H04R 5/033; H04R 2410/05
See application file for complete search history.

(56) References Cited

U.S. PATENT DOCUMENTS

| | | | | |
|---|---|---|---|---|
| 5,852,667 | A | 12/1998 | Pan | |
| 6,278,786 | B1 | 8/2001 | McIntosh | |
| 6,396,930 | B1 | 5/2002 | Vaudrey | |
| 6,449,369 | B1 * | 9/2002 | Carme | G10K 11/17854 381/71.13 |
| 6,898,290 | B1 | 5/2005 | Saunders | |
| 8,693,700 | B2 | 4/2014 | Bakalos et al. | |
| 8,718,291 | B2 | 5/2014 | Alves | |
| 2003/0228019 | A1 | 12/2003 | Eichler | |
| 2006/0013408 | A1 | 1/2006 | Lee | |
| 2007/0098119 | A1 | 5/2007 | Stothers | |
| 2008/0112569 | A1 * | 5/2008 | Asada | G10K 11/17833 381/71.1 |
| 2008/0112570 | A1 * | 5/2008 | Asada | G10K 11/17855 381/71.11 |
| 2008/0310645 | A1 * | 12/2008 | Itabashi | G10K 11/17873 381/71.1 |
| 2009/0010442 | A1 * | 1/2009 | Usher | H04R 1/10 381/57 |
| 2009/0034748 | A1 * | 2/2009 | Sibbald | G10K 11/17823 381/71.6 |
| 2009/0041260 | A1 | 2/2009 | Jorgensen | |
| 2009/0080670 | A1 | 3/2009 | Solbeck | |
| 2009/0136052 | A1 | 5/2009 | Hohlfeld | |
| 2010/0142718 | A1 * | 6/2010 | Chin | G10K 11/17885 381/71.8 |
| 2010/0260341 | A1 | 10/2010 | Sander | |
| 2010/0272276 | A1 * | 10/2010 | Carreras | H04R 1/1008 381/71.8 |
| 2010/0272277 | A1 * | 10/2010 | Joho | G10K 11/17881 381/71.6 |
| 2011/0129098 | A1 | 6/2011 | Delano et al. | |
| 2012/0170766 | A1 * | 7/2012 | Alves | H04R 1/1083 381/71.11 |
| 2012/0250873 | A1 * | 10/2012 | Bakalos | G10K 11/17854 381/71.8 |
| 2016/0329042 | A1 * | 11/2016 | Christoph | G10K 11/17815 |
| 2017/0034619 | A1 * | 2/2017 | Kumar | G10K 11/17854 |
| 2017/0053640 | A1 * | 2/2017 | Kwan | G10K 11/17885 |

* cited by examiner

METHOD AND SYSTEM FOR HYBRID NOISE CANCELLATION

CROSS-REFERENCE TO RELATED APPLICATION

This application is a continuation of U.S. patent application Ser. No. 13/646,921, filed Oct. 8, 2012, which claims priority to U.S. Provisional Patent Application Ser. No. 61/544,864, filed Oct. 7, 2011, entitled HYBRID ANALOG DIGITAL ACTIVE NOISE CANCELLER, naming Nitish K. Murthy et al. as inventors, both are hereby fully incorporated herein by reference for all purposes.

BACKGROUND

The disclosures herein relate in general to audio signal processing, and in particular to a method and system for hybrid active noise cancellation.

A user may hear noise from a surrounding environment. A mechanical structure can attempt to physically buffer the user's ears against some of the noise, but the mechanical structure has limits. In addition to the mechanical structure, an active noise cancellation system can attempt to generate signals for cancelling at least some of the noise. Nevertheless, different techniques for active noise cancellation have respective shortcomings and trade-offs.

SUMMARY

From a first microphone, first microphone signals are received that represent first sound waves. From a second microphone, second microphone signals are received that represent second sound waves. In response to the first microphone signals, analog processing is performed to estimate noise in the first sound waves, and first analog signals are generated for cancelling at least some of the estimated noise in the first sound waves. In response to the second microphone signals, digital processing is performed to estimate noise in the second sound waves, and digital information is generated for cancelling at least some of the estimated noise in the second sound waves. The digital information is converted into second analog signals that represent the digital information. The first and second analog signals are combined into third analog signals for cancelling at least some of the estimated noise in the first and second sound waves.

DETAILED DESCRIPTION

Figure 1:
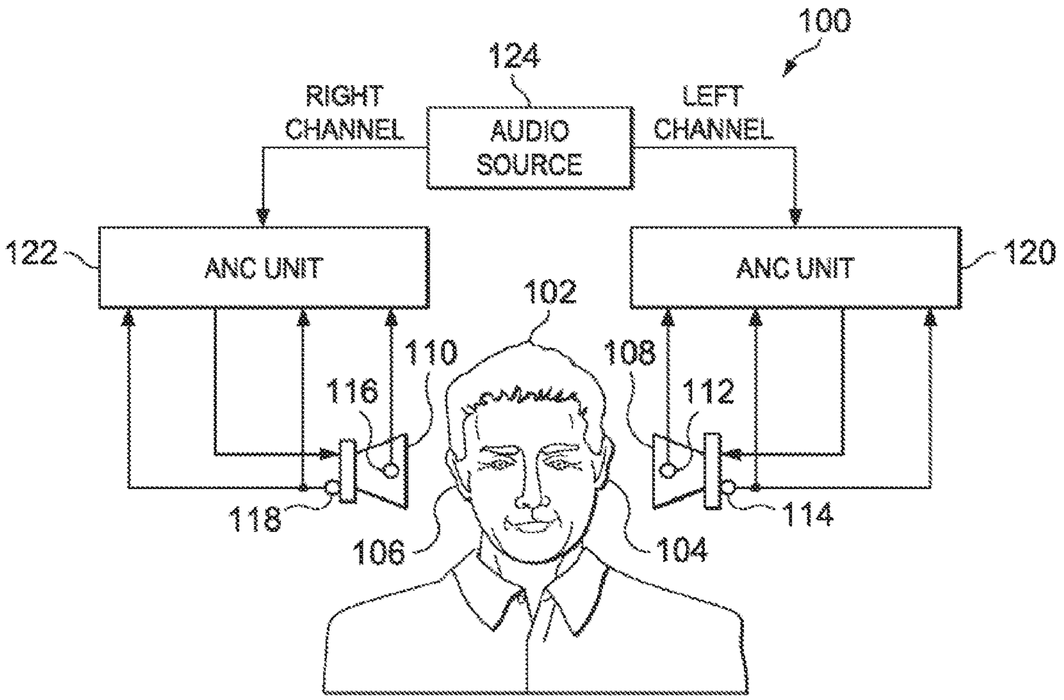
FIG. 1 is a block diagram of a system of the illustrative embodiments.

FIG. 1 is a block diagram of a system, indicated generally at 100, of the illustrative embodiments. A human user 102 has a left ear 104 and a right ear 106 for hearing. An earset 108, which at least partially fits over and/or into the ear 104, has: (a) a right side, which faces the ear 104, and which has a built-in speaker for outputting sound waves to the ear 104; and (b) a left side (opposite from the right side), which faces away from the ear 104 toward an environment around the left side of the earset 108 ("left surrounding environment"). Similarly, an earset 110, which at least partially fits over and/or into the ear 106, has: (a) a left side, which faces the ear 106, and which has a built-in speaker for outputting sound waves to the ear 106; and (b) a right side (opposite from the left side), which faces away from the ear 106 toward an environment around the right side of the earset 110 ("right surrounding environment"). In one example, the earsets 108 and 110 include mechanical structures that physically buffer the ears 104 and 106, respectively, against some noise from within the left and right surrounding environments.

The earset 108 is integral with: (a) an error microphone 112, which is located on the right (interior) side of the earset 108; and (b) a reference microphone 114, which is located on the left (exterior) side of the earset 108. The error microphone 112: (a) converts, into analog signals, sound waves from a space between the ear 104 and the right side of the earset 108 (e.g., including sound waves from the built-in speaker of the earset 108); and (b) outputs those signals. The reference microphone 114: (a) converts, into analog signals, sound waves from the left surrounding environment (e.g., ambient noise around the reference microphone 114); and (b) outputs those signals.

The earset 110 is integral with: (a) an error microphone 116, which is located on the left (interior) side of the earset 110; and (b) a reference microphone 118, which is located on the right (exterior) side of the earset 110. The error microphone 116: (a) converts, into analog signals, sound waves from a space between the ear 106 and the left side of the earset 110 (e.g., including sound waves from the built-in speaker of the earset 110); and (b) outputs those signals. The reference microphone 118: (a) converts, into analog signals, sound waves from the right surrounding environment (e.g., ambient noise around the reference microphone 118); and (b) outputs those signals.

Accordingly, the signals from the error microphone 112 and the reference microphone 114 represent various sound waves. An active noise cancellation ("ANC") unit 120: (a) receives and processes the signals from the error microphone 112 and the reference microphone 114; and (b) in response thereto, outputs analog signals for cancelling at least some noise in those sound waves. The built-in speaker of the earset 108: (a) receives the signals from the ANC unit 120; and (b) in response thereto, outputs additional sound waves for achieving the noise cancellation.

Similarly, the signals from the error microphone 116 and the reference microphone 118 represent sound waves. An ANC unit 122: (a) receives and processes the signals from the error microphone 116 and the reference microphone 118; and (b) in response thereto, outputs analog signals for cancelling at least some noise in those sound waves. The built-in speaker of the earset 110: (a) receives the signals from the ANC unit 122; and (b) in response thereto, outputs additional sound waves for achieving the noise cancellation.

In one example, the ANC unit 120 optionally: (a) receives digital audio information from a left channel of an audio source 124; and (b) combines the left channel's audio into the signals that the ANC unit 120 outputs to the built-in speaker of the earset 108. Accordingly, in this example: (a) the built-in speaker of the earset 108 further outputs sound waves (e.g., music and/or speech) that are represented by the left channel's digital audio information, so that those sound waves are audible to the ear 104; and (b) the ANC unit 120 suitably accounts for those sound waves in its further processing of the signals from the error microphone 112 for cancelling at least some noise in those sound waves.

Similarly, the ANC unit 122 optionally: (a) receives digital audio information from a right channel of the audio source 124; and (b) combines the right channel's audio into the signals that the ANC unit 122 outputs to the built-in speaker of the earset 110. Accordingly, in this example: (a) the built-in speaker of the earset 110 further outputs sound waves (e.g., music and/or speech) that are represented by the right channel's digital audio information, so that those sound waves are audible to the ear 106; and (b) the ANC unit 122 suitably accounts for those sound waves in its further processing of the signals from the error microphone 116 for cancelling at least some noise in those sound waves.

Figure 2:
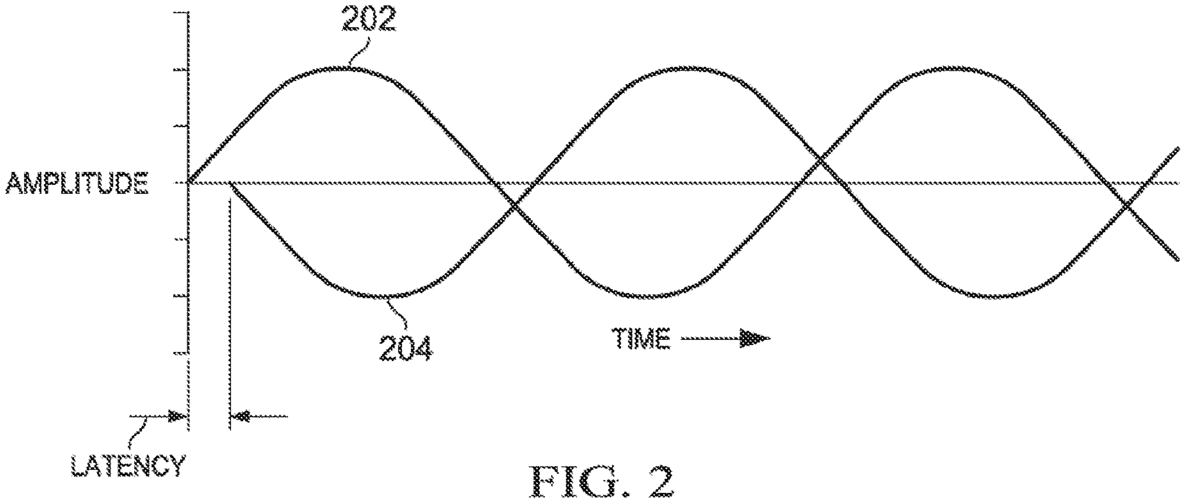
FIG. 2 is a graph of an example noise signal and an example noise cancellation signal.

FIG. 2 is a graph of: (a) an example noise signal 202, such as a signal from the error microphone 112 or the reference microphone 114; and (b) an example noise cancellation signal 204, such as a signal from the ANC unit 120 to the built-in speaker of the earset 108. As shown in FIG. 2, the signal 204 is substantially inverted from the signal 202, so that a phase of the signal 204 is shifted (relative to a phase of the signal 202) by ~180 degrees (e.g., 180 degrees plus a latency) across a bandwidth of the signals 202 and 204. For example, the latency may result from a processing cycle of the ANC unit 120. In this manner, the signal 204 is effective for cancelling at least some noise in a sound wave that is represented by the signal 202.

Figure 3:
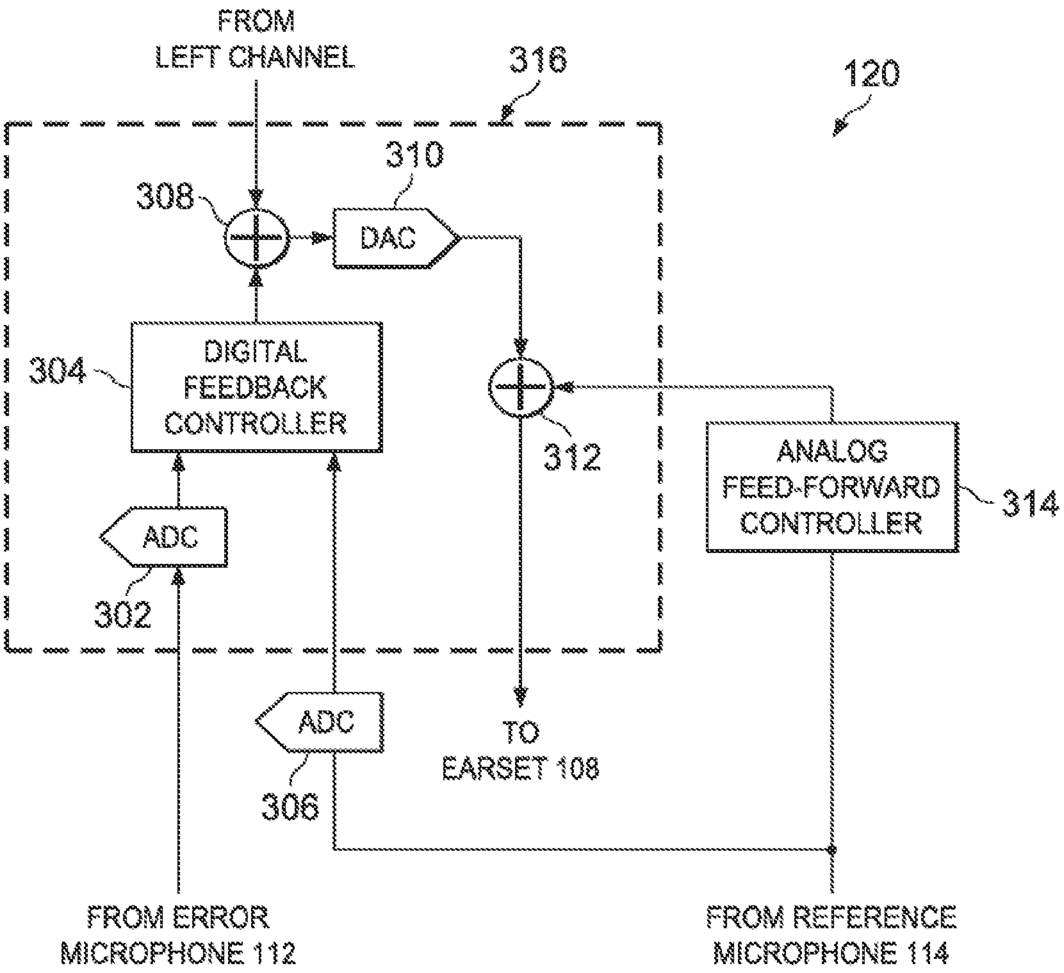
FIG. 3 is a block diagram of an active noise cancellation ("ANC") unit of the system of FIG. 1.

FIG. 3 is a block diagram of the ANC unit 120, which is a representative one of the substantially identical ANC units 120 and 122. The error microphone 112 is coupled through an analog-to-digital converter ("ADC") 302 to a digital feedback controller 304, so that the ADC 302: (a) from the error microphone 112, receives the analog signals that the error microphone 112 outputs in response to sound waves from the space between the ear 104 and the right side of the earset 108; (b) converts those analog signals into corresponding digital data that represent those sound waves; and (c) outputs such digital data to the digital feedback controller 304. Optionally (e.g., programmably), the reference microphone 114 is coupled through an ADC 306 to the digital feedback controller 304, so that the ADC 306: (a) from the reference microphone 114, receives the analog signals that the reference microphone 114 outputs in response to sound waves from the left surrounding environment; (b) converts those analog signals into corresponding digital data that represent those sound waves; and (c) outputs such digital data to the digital feedback controller 304.

In response to such digital data from the ADC 302, and optionally in response to such digital data from the ADC 306, the digital feedback controller 304: (a) performs digital processing to estimate noise in those sound waves; and (b) generates digital information for cancelling at least some of the estimated noise ("noise cancellation information"). A digital mixer 308 combines the noise cancellation information and the digital audio information (if any) that the digital mixer 308 receives from the left channel of the audio source 124. A digital-to-analog converter ("DAC") 310: (a) receives such combined information from the digital mixer 308; (b) converts such combined information into corresponding analog signals that represent such combined information; and (c) outputs those analog signals to an analog mixer 312.

The reference microphone 114 is connected to an analog feed-forward controller 314, so that the analog feed-forward controller 314: (a) from the reference microphone 114, receives the analog signals that the reference microphone 114 outputs in response to sound waves from the left surrounding environment; (b) in response to such analog signals, performs analog processing to estimate noise in those sound waves; and (c) generates analog signals for cancelling at least some of the estimated noise ("noise cancellation signals"). For that purpose, in one embodiment, the analog feed-forward controller 314 includes at least one inverting operational amplifier. In the illustrative embodiments, the analog feed-forward controller 314 outputs the noise cancellation signals in a manner that accounts for physical buffering (e.g., filtering) by a mechanical structure of the earset 108, so that: (a) the analog feed-forward controller 314 estimates noise that such physical buffering fails to exclude from the space between the ear 104 and the right side of the earset 108 ("remaining noise"); (b) the noise cancellation signals are for cancelling at least some of the remaining noise; and (c) accordingly, the noise cancellation signals are substantially inverted (and their phases are shifted by ~180 degrees) from the remaining noise across a bandwidth thereof.

The analog mixer 312: (a) combines the noise cancellation signals and the analog signals that the analog mixer 312 receives from the DAC 310; and (b) outputs such combined signals to the earset 108. The built-in speaker of the earset 108: (a) receives such combined signals from the analog mixer 312; and (b) in response thereto, outputs additional sound waves for achieving the noise cancellation.

In comparison to a feed-forward controller, a feedback controller's efficacy is especially improved if its operations are performed by digital processing, which enhances precision of such operations. Accordingly, in the ANC unit 120: (a) the feedback controller 304 performs its operations by digital processing, with oversampling, in either an adaptive manner (e.g., in a first embodiment) or a non-adaptive manner (e.g., in a second embodiment); and (b) the feed-forward controller 314 perform its operations by analog processing.

In that manner, the ANC unit 120 implements a hybrid analog-digital ANC technique whose advantages include: (a) with the analog feed-forward controller 314, relatively good noise cancellation at lower frequencies; (b) with the digital feedback controller 304, digital tuneability, and cancellation of at least some residual noise that would have otherwise remained uncancelled by the analog feed-forward controller 314; and (c) aggregately, better noise cancellation over a wider range of frequencies. For example, in comparison to the digital feedback controller 304, the analog operations of the analog feed-forward controller 314 are less precise (which may allow residual noise to remain uncancelled) and more cumbersome to tune, but those analog operations achieve: (a) reduced latency for supporting higher frequency bandwidths at lower sampling rates; (b) more stability; and (c) better noise cancellation at lower frequencies. In comparison to the analog feed-forward controller 314, the digital operations of the digital feedback controller 304 have more latency (which may reduce phase margin and diminish stability) and less noise cancellation at lower frequencies, but those digital operations achieve a bandwidth of cancellation that is: (a) digitally tuneable (e.g., programmable coefficients of noise filtering); and (b) relatively large at high feedback loop gains.

In a first alternative embodiment, the error microphone 112 and the reference microphone 114 remain located on opposite sides (of the earset 108) from one another, but the reference microphone 114 is spaced a farther distance (e.g., several inches or feet) away from the earset 108. In a second alternative embodiment, the error microphone 112 and the reference microphone 114 are located on the same side (of the earset 108) as one another, so that they convert sound waves that may be similar to (or even identical) to one another. In one example of the second alternative embodiment, the error microphone 112 and the reference microphone 114 are both located on the right side of the earset 108. Even in the first and second alternative embodiments, many of the hybrid analog-digital ANC technique's advantages (discussed hereinabove) are still achieved, because: (a) the error microphone 112 remains coupled through the ADC 302 to the digital feedback controller 304; and (b) the reference microphone 114 remains connected to the analog feed-forward controller 314 and is optionally coupled through the ADC 306 to the digital feedback controller 304.

The system 100 is formed by electronic circuitry components for performing the system 100 operations, implemented in a suitable combination of software, firmware and hardware. In one embodiment, such components include a digital signal processor ("DSP"), which is a computational resource for executing instructions of computer-readable software programs to process data (e.g., a database of information) and perform additional operations (e.g., communicating information) in response thereto. For operations of the DSP, such programs and data are stored in a memory of the DSP and/or in another computer-readable medium (e.g., hard disk drive, flash memory card, or other nonvolatile storage device) of the system 100.

In the illustrative embodiments, a single DSP is suitably programmed to perform certain operations of both ANC units 120 and 122, so that the single DSP implements portions of both ANC units 120 and 122. In one example, the single DSP is a suitably programmed stereo audio codec with embedded miniDSP, such as part number TLV320AIC3254 available from TEXAS INSTRUMENTS INCORPORATED of Dallas, Texas. In that example, the single DSP is suitably programmed to implement: (a) portions indicated by a dashed enclosure 316 of the ANC unit 120; and (b) substantially identical portions of the ANC unit 122.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by a combination of electronic circuitry components for active noise cancellation, the method comprising:

from a first microphone, receiving first analog microphone signals that represent first sound waves;

from a second microphone, receiving second analog microphone signals that represent second sound waves, wherein the second sound waves are buffered from the first sound waves by a mechanical structure between the first and second microphones;

converting the first analog microphone signals into first digital data and the second analog microphone signals into second digital data;

performing digital feedback processing on the first digital data and the second digital data to estimate first noise in the second sound waves;

generating noise cancelation information for canceling at least some of the estimated first noise;

combining the noise cancelation information and digital audio information from an audio source to generate combined digital information;

converting the combined digital information into third analog signals;

performing analog processing on the first analog microphone signals to estimate remaining noise that physical buffering of an earset fails to exclude from a space on a side of the earset;

generating fourth analog signals for canceling at least some of the estimated remaining noise by at least modifying the first analog microphone signals based on the estimated remaining noise;

combining the third and fourth analog signals into fifth analog signals; and outputting the fifth analog signals to the earset.

2. The method of claim 1, wherein receiving the first analog microphone signals and receiving the second analog microphone signals include:

from the first microphone, receiving the first analog microphone signals that represent the first sound waves from an environment around a first side of the earset; and from the second microphone, receiving the second analog microphone signals that represent the second sound waves from a space between an ear and a second side of the earset.

3. The method of claim 2, wherein the earset includes the mechanical structure, and wherein generating the noise cancellation information includes:

in response to the first analog microphone signals, generating the fourth analog signals in a manner that accounts for physical buffering by the mechanical structure.

4. The method of claim 1, further comprising converting the first analog microphone signals into the first digital data that represent the first analog microphone signals.

5. The method of claim 4, wherein the noise cancelation information is for cancelling at least some of the estimated first noise in the second sound waves.

6. A system for active noise cancellation, the system comprising:

a combination of electronic circuitry components configured for:

from a first microphone, receiving first analog microphone signals that represent first sound waves;

from a second microphone, receiving second analog microphone signals that represent second sound waves, wherein the second sound waves are buffered from the first sound waves by a mechanical structure of an earset between the first and second microphones;

converting the first analog microphone signals into first digital data and the second analog microphone signals into second digital data;

performing digital feedback processing on the first digital data and the second digital data to estimate first noise in the second sound waves;

generating noise cancelation information for canceling at least some of the estimated first noise;

combining the noise cancelation information and digital audio information from an audio source to generate combined digital information;

converting the combined digital information into third analog signals;

performing analog processing on the first analog microphone signals to estimate remaining noise that the mechanical structure fails to exclude from a space on a side of the earset;

generating fourth analog signals for canceling at least some of the estimated remaining noise by at least modifying the first analog microphone signals based on the estimated remaining noise;

combining the third and fourth analog signals into fifth analog signals; and outputting the fifth analog signals to the earset.

7. The system of claim 6, wherein receiving the first analog microphone signals and receiving the second analog microphone signals include:

from the first microphone, receiving the first analog microphone signals that represent the first sound waves from an environment around a first side of the earset; and from the second microphone, receiving the second analog microphone signals that represent the second sound waves from a space between an ear and a second side of the earset.

8. The system of claim 7, wherein the earset includes the mechanical structure, and wherein generating the noise cancellation information includes:

in response to the first analog microphone signals, generating the fourth analog signals in a manner that accounts for physical buffering by the mechanical structure.

9. The system of claim 6, wherein the combination of electronic circuitry components is configured for: converting the first analog microphone signals into the first digital data that represent the first analog microphone signals.

10. The system of claim 9, wherein the noise cancelation information is for cancelling at least some of the estimated first noise in the second sound waves.

11. An apparatus comprising:

an earset including an interior side and an exterior side and including a mechanical structure arranged between the interior side and the exterior side;

a first microphone positioned on the exterior side of the earset;

an analog feed-forward controller configured to:

estimate remaining noise that the mechanical structure fails to exclude from the interior side of the earset;

generate an analog-generated cancellation signal based on the estimated remaining noise and in response to a first analog microphone signal received from the first microphone;

a second microphone positioned on the interior side of the earset;

a first analog-to-digital converter (ADC) configured to generate a corresponding digital representation of a second analog microphone signal received from the second microphone;

a digital feedback controller configured to generate a digitally generated cancellation signal in response to the corresponding digital representation of the second analog microphone signal;

a digital mixer configured to generate a digital combined cancellation-and-audio-information signal in response to the digitally generated cancellation signal and digital audio information received from an audio source;

a digital-to-analog converter (DAC) configured to generate an analog combined cancellation-and-audio-information signal in response to the digital combined cancellation-and-audio-information signal; and an analog mixer configured to generate an analog combined output signal in response to the analog combined cancellation-and-audio-information signal and the analog-generated cancellation signal, wherein the earset further includes a speaker configured to output sound waves in response to the analog combined output signal.

12. The apparatus of claim 11, further comprising a second ADC configured to generate a corresponding digital representation of the first analog microphone signal received from the first microphone, wherein the digital mixer is configured to generate the analog combined cancellation-and-audio-information signal in response to the corresponding digital representation of the first analog microphone signal.

13. The apparatus of claim 12, wherein the analog feedforward controller includes at least one inverting operational amplifier configured to generate the analog-generated cancellation signal.

14. The apparatus of claim 13, wherein the digital feedback controller includes programmable coefficients.

15. The apparatus of claim 11, wherein the mechanical structure is arranged to at least partly buffer a user's ear from noise from a surrounding environment.

16. The apparatus of claim 15, wherein the analog feed-forward controller is configured to generate the analog-generated cancellation signal to cancel at least some of the noise that the mechanical structure fails to exclude from the interior side of the earset.

* * * * *